United States Patent [19]

Lafreniere

[11] Patent Number: 4,821,118
[45] Date of Patent: Apr. 11, 1989

[54] VIDEO IMAGE SYSTEM FOR PERSONAL IDENTIFICATION

[75] Inventor: Roger F. Lafreniere, Tewksbury, Mass.

[73] Assignee: Advanced Identification Systems, Inc., Tewksbury, Mass.

[21] Appl. No.: 917,007

[22] Filed: Oct. 9, 1986

[51] Int. Cl.⁴ ............................................. H04N 7/18
[52] U.S. Cl. ..................... 358/108; 358/102; 358/225; 358/93; 382/4
[58] Field of Search ............... 358/108, 102, 93; 354/105, 109; 340/825.31, 825.34, 506, 541; 382/2, 4, 5

[56] References Cited

U.S. PATENT DOCUMENTS

| | | | |
|---|---|---|---|
| 2,914,746 | 11/1959 | James | 358/108 X |
| 3,201,100 | 10/1972 | Yarbrough | 358/108 X |
| 3,383,657 | 5/1968 | Claassen et al. | 358/108 X |
| 3,564,132 | 2/1971 | Baker et al. | 358/108 |
| 3,581,282 | 5/1971 | Altman | |
| 3,612,764 | 12/1971 | Gilkeson | 358/108 |
| 3,614,737 | 10/1971 | Sadowsky | 382/2 |
| 3,639,905 | 2/1972 | Yaida | |
| 3,924,105 | 12/1975 | Gassino et al. | 382/2 X |
| 4,032,889 | 6/1977 | Nassimbeme | 340/825.34 X |
| 4,167,756 | 9/1979 | Smith | 358/225 |
| 4,186,378 | 1/1980 | Moulton | |
| 4,202,120 | 5/1980 | Engel | 382/4 X |
| 4,236,082 | 11/1980 | Butler | |
| 4,253,086 | 2/1981 | Szwarcbier | 382/4 |
| 4,325,570 | 4/1982 | Estrada | |
| 4,337,482 | 6/1982 | Coutta | 358/108 |
| 4,418,364 | 11/1983 | Wine | 358/336 |
| 4,450,487 | 5/1984 | Koide | 358/335 |
| 4,477,841 | 10/1984 | Chen et al. | 358/335 |
| 4,511,886 | 4/1985 | Rodriguez | 340/534 |
| 4,516,845 | 5/1985 | Blakely | 354/109 X |
| 4,573,193 | 2/1986 | Shuto et al. | 382/4 X |
| 4,581,634 | 4/1986 | Williams | 358/108 |
| 4,586,441 | 5/1986 | Zekich | 382/2 X |

Primary Examiner—Howard W. Britton
Assistant Examiner—Victor R. Kostak
Attorney, Agent, or Firm—Robert T. Dunn

[57] ABSTRACT

A video image system for rapidly (in a few seconds) recording a person and his identification (ID) card makes video images of the person's hand palm and face along with the ID card presented by the person that may be a badge, card, drivers license, passport, or other item issued by some authority, and combines those images and presents the combined image on a video monitor for immediate inspection by a guard, store clerk or attendant, and, in addition, stores the combined image along with time and date superimposed thereon so that it can be reviewed later. The system includes at a designated place entered by the person to be recorded, a viewing table in easy reach of the person on which there are viewing areas for the person's palm and the ID card that he presents and video cameras arranged for scanning his palm, ID card and his face producing video images that are combined electronically producing a combined video image of the palm, ID card and face that is viewed on a video monitor and recorded on a video cassette recorder (VCR) along with the time and date. The combined image that is recorded can be reviewed later as a review of the identification event.

27 Claims, 5 Drawing Sheets

VIDEO IMAGE SYSTEM FOR PERSONAL IDENTIFICATION

BACKGROUND OF THE INVENTION

The present invention relates to personal identification systems and particularly to a system for observing and recording a person and his identification item so that the recorded information can be retrieved at a later time for confirmation and/or further examination and review of the identification event.

Palm Print Identification

Studies by government agencies such as the Federal Bureau of Investigation and the Armed Services have demonstrated that a person's palm print is unique and can be used like finger prints to identify a person. This has led to efforts for automatically reading a palm print and even further for comparing it with a reference, or with reference information, to establish a person's identity. This has been done by comparing a palm print with palm prints from a library of palm prints of known individuals to establish whether the one inspected is one of the known individuals. Techniques have been suggested for performing this comparison automatically. One such technique digitizes identifying information on the palm creases and ridges producing an arry of numbers which constitute a code that uniquely identifies the individual palm.

Taking the palm print in a conventional way is much like taking a finger print and requires applying ink to the palm and pressing the palm lightly against a paper blank to make the print that is then analyzed. This is not possible or at least would be very inconvenient in all business settings and even in the process for identifying employees entering secured industrial and government areas.

As yet, there are not the files of individual palm prints that have been maintained over many years as has been done with fingerprints. Probably for that reason, palm prints and footprints have been used by police and other authorities to only a limited degree, particularly for identification of infants.

The techniques for analyzing a person's palm print have to this date resulted only in providing a way of encoding information, like the array of numbers generated, on the person's ID card as a representation of the person's palm. To make use of that encoded information, a special ID card reader and computer are required to decode the information and reconstruct the image of the palm from it and then compared that image with the palm print of the person who presents the ID card to ascertain that that person is in fact the person for whom the card was made. These techniques have not been used for the reasons given above.

It is an object of the present invention to make use of the uniqueness of a person's palm for identification of the person and provide a system for quickly (within a few seconds) and easily recording an image representative of the palm print along with other unique identification, that requires very little cooperation from the person and can even be recorded without the person realizing or being particularly aware that the recording is being made, for later analysis by visual review to uncover any discrepancies in the identification.

Security Systems

Heretofore, security systems have been provided for use by a guard to monitor access to a restricted area at government and industrial facilities. Such systems are usually used where large numbers of employees must be admitted, one after another, to the restricted area and the identification by the guard of each employee must not take more than a few seconds. Such security systems may include remote video monitoring by the guard and even remote control of gates into the secured area by the guard when he ascertains by observing a person on his monitor that the person passes a criteria of identification.

Such systems have used one or more video cameras that cover the entrance area and a receptacle is provided for the person to insert his ID card or badge on which there may be a picture of the person's face. While in that receptacle, the ID card may also be examined optically, magnetically or mechanically for validity if the card is so encoded. A second video camera scans the ID card and the images from both cameras are combined and fed to the guards monitor. If the person appears to be the same as the picture on the card and the card is valid, the guard opens the gate admitting the person. For convenience of observation, the system combines the video signals from the cameras electrically using a conventional screen splitter circuit and the combined video picture is produced on the guard's monitor.

Security identification systems such as this are used to do remotely essentially the same things the guard would do at the gate where he physically present there. The system serves only to observe the person and his ID card remotely. In addition, from one remote location a guard can monitor several gates that are equipped with such cameras and may use a separate monitor for each gate or time sequence observations from gate to gate and observe all on one monitor.

Some of the limitations of such prior security systems are that: an impostor who looks enough like the picture in a valid, but stolen ID card, may not detected by the guard; an impostor with a counterfeit or forged ID card that can pass whatever checks are made of the card validity will not be detected by the guard; and the guard's decision which must be made in a few seconds, cannot be reviewed later except from the guards memory.

It is an object of the present invention to provide a method and means for quickly and easily observing a unique part of the person's anatomy along with the person's ID card and appearance and for storing images of those observations for review and comparison with other records, should be need arise.

It is another object to provide such a method and system that makes a record of those images observed at the identification along with date and time, such that all of the images observed along with time and date can be reviewed later.

Screening Travelers Boarding Airlines, Ships, Etc.

Hijacking and terrorism of commercial aircraft has become an international problem and goes on it spite of use of equipment at airline terminals for inspecting luggage and each individual passenger for weapons. For those inspections, x-ray equipment is used to view the contents of luggage bags and metal detectors at portals through which the passenger walks are used to detect large metal objects on the person. These efforts have not stopped such terrorism, because weapons are secreted onto the airplane in other ways than in luggage or on the person.

There is as yet no systematic thorough screen and record made of all persons who board a commercial aircraft. A reason for this may be that airline terminals are, for the most part, open to the public and the areas of the terminals at the gate are open to anyone with a ticket and tickets can be obtained in many ways and so there is no way of screening ticket purchasers. Besides, there is no assurance that the one in possession of a ticket is the purchaser. The heavy traffic of travelers in both directions in a terminal and the easy availability of tickets make it impractical, if not impossible, to stop determined terrorists by screening ticket purchasers.

The most effective place to screen passengers is on the airplane after all have been boarded. However, it is difficult, because the crew is busy seating and securing passengers and ready the plane for takeoff and the passengers are dispersed throughout the plane. The next most effective place to screen passengers is where they board the plane. At many terminals, all boarding passengers enter a narrow passageway from the terminal gate to the aircraft, after first showing a boarding pass and ticket to an attendant (usually one of the crew on the plane they are boarding). As a rule, the passengers enter that passageway one after another (single file). At the present time, the attendant does nothing more than look at each entering passengers boarding pass and then take or at least look at the passenger's ticket.

It is an object of the present invention to provide a method and means for observing and recording at least one form of unique personal identification of each passenger as well as the passengers boarding pass or passport (in the case of international flights) as each individual passenger boards the aircraft, all within a few seconds time and without interrupting the flow of passengers into the passageway is another object to provide such a method and means that makes a picture of the passenger's hand palm, face and boarding pass along with added images of the time and date such that these image can be reviewed remotely as they are made and reviewed later should the need arise.

Retail Customer credit & Other Identification

Personal identification of a customer of a retail store who pays by check or charge card and/or who buys firearms or alcoholic beverages or other controlled substances is done by sales clerks in many different ways, depending on what records the store proprietor must keep according to law and on the proprietor's election and often depends on how busy the store is, because such record keeping takes time and is an inconvenience to the customer.

For example, a customer of an alcoholic beverage package store must show that he is of drinking age (is not underage). This is most commonly accomplished with the customer's drivers license. The usual drivers license is a card that has a photographic picture of the person (licensee) on one face of the card. Such a drivers license is difficult to forge or fake. However, often the picture on the license is not a very good likeness of the person and unless the clerk carefully examines the license and compares the picture with the customer who presents the license, it is relatively easy for one to use another person's drivers license and fool the clerk. This situation occurs all too frequently in bars and package stores where young people who are not old enough at low to purchase alcoholic beverage (not of drinking age) may use the drivers license of another who is old enough, to pass the clock.

Altering a drivers license by the person to whom it is issued, also occurs. In many states a person may qualify to drive and get a driver license at an age below the drinking age. Although it is a criminal offense, an underage person may alter his birth date on his drivers license and present it to the sales clerk in order to by alcoholic beverages.

The proprietor of a bar or a package store that sells alcoholic beverage to one who is not of drainking age may have his permit or license to sell alcoholic beverage revoked by the authority (state and/or local) that granted it. Such authorities are often called Alcoholic Beverage Commision or ABC. In addition, the bar or package store proprietor can be found liable at civil law for the damage done by a drunk driver who got drunk on alcoholic beverage purchased at the bar or store, where it can be shown that the proprietor (clerk) should have known that the purchaser was going to drive drunk. Where the purchaser is under the drinking age, this knowledge may be presumed.

This liability of the proprietor for the damage done by a drunk driver, even one who is of drinking age, gives the proprietor good reason to keep records of each customer that identify the customer and the date and time of purchase. This record, along with some record of what the customer purchases can be used for the proprietors defense. It may show that the proprietor did not sell enough alcoholic beverage to that customer to make him drunk, or that the drunk driver was not a customer at all.

The possibility that the proprietor's permit or licence from an ABC or serving customers who are not of drinking age, will be revoked places a burden on the proprietor not only to carefully identify all customers who may be underage, but also to document the identification process so that the proprietor can prove that it was diligent and thorough and all that could be required by the ABC.

Convincing documentation and/or corroboration of the identification of a customer could include pictures of the person and his drivers license along with evidence of where and when the pictures were taken. Clearly, all of that would be very time consuming and expensive and would slow business excessively, particularly in large night clubs frequented by uoung adults where hundreds of customers are interrogated (carded) in a few hours time.

Documentation including pictures of the customer taken by the sales clerk may not make out a sufficient defense for the proprietor where the similarity between the picture of the drivers license and the picture of the customer is not conclusive. For example, an underage customer may falsely testify that he purchased alcoholic beverage from the package store using another's license and that he is the individual in the picture. This would imply that the store clerk (the proprietor) was negligent in checking identification. To overcome that situation, the proprietor would need further evidence to identify the customer, in addition to the picture taken, like finger prints, a palm print or voice print, none of which can be taken easily and quickly.

It is an object of the present invention to provide an improved system for quickly documenting the identification of a customer at a retail store and storing the documentation for easy retrieval, which avoids the limitations and problems mentioned above.

It is another object to provide such a system that records the customer's palm as well as a picture of the customer and the drivers license he presents at the time and automatically recording the time and date and evidence of the purchase that can be reviewed at a later time and presented as evidence, should the need arise.

Summary Of The Invention

A video image system for identifying a person by the person's hand palm and face, along with the person's ID card or pass that may have a picture of the person on it, includes several video cameras or scanners and a video cassette recorder (VCR) that records images of the person's palm and face and the ID card or pass presented, all at the same time, along with the date and time. This basic system has use in security at a gate to a secured area by a security guard to monitor access of qualified people to the secured area; it has use for screening passengers boarding an airline to make unique body identifications of the boarding passengers along with the passengers seat pass or passport; and for personal identification of customers of a commercial business to make a record for a credit check of customers paying by check or charge card or to make a record of customers buying controlled substances like alcoholic beverages, drugs or firearms.

The basic system includes several video cameras for producing images of the persons's hand palm, and face when the person enters a designated place and follows simple instructions. At the designated place is a viewing area on which the person places his hand so that the palm of the hand can be viewed, a viewing area for the person's ID card or pass and while the person is at that designated place and even while placing his hand so that the palm of his hand can be viewed, the person's face is within view of a video camera. The viewing areas for the hand palm and the ID card may be next to each other on a common platform, inasmuch as the person may easily place his ID card on that platform and then place his hand on the same platform next to the ID Card.

Hence, it is convenient to view both the palm and the ID card with a single video camera that produces a video picture of both together. Meanwhile, another video camera is located to view the person's face while that person is holding his hand on the platform. The video images from these cameras are combined using a video screen splitter producing a combined video image which can be viewed on a monitor and stored on a video recorder, like a VCR. In a preferred embodiment, the combined video image is recorded on a video cassette recorder (VCR) in which the data can be set and there is a clock and means for producing a video image of the time and date as part of the total recorded (composite or combined) image.

These and other features, objects and uses of the present invention are apparent from the following detailed description of embodiments of the invetion and the drawings.

DESCRIPTION OF EMBODIMENTS OF THE INVENTION

Basic System

FIGS. 1 to 5 show basic equipment that may be used for any of the purposes mentioned above and is most effective when the person going through the system follows very simple steps that take only a few seconds to carry out. If the person does not follow those steps, an attendant may question the person further.

Figures 1, 2:
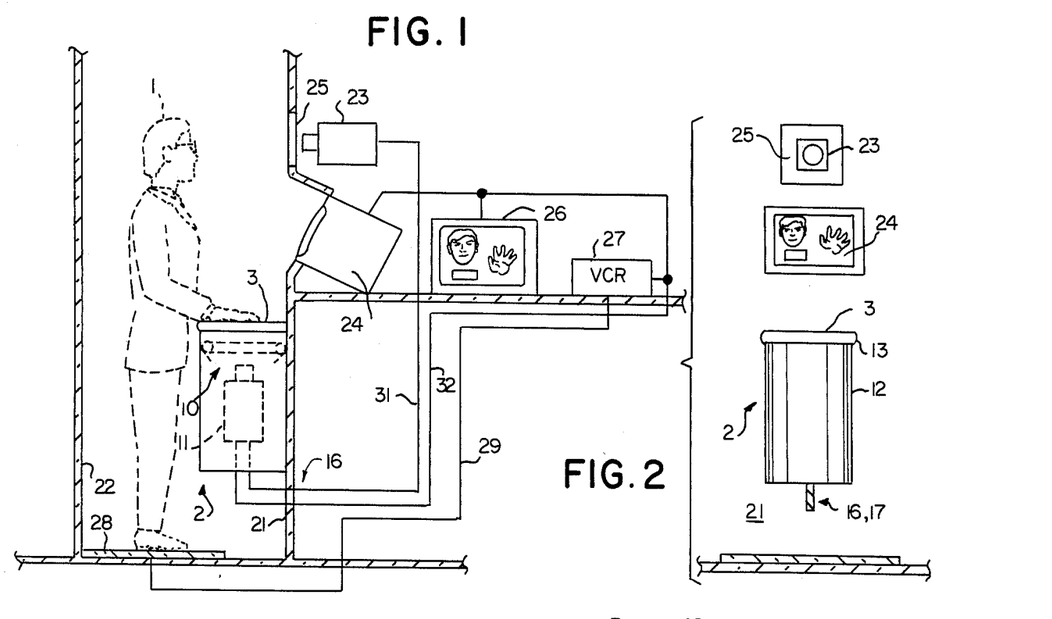
FIG. 1 is a partly pictorial diagram showing the principal electrical video parts of the basic system for monitoring a person seeking entrance to a secured area, or a customer seeking entry a commercial business restricted to patrons who are of drinking age, or a passenger boarding an airplane standing at a designated place for such identification, in which video images are simultaneously generated of the person's hand palm, face and badge, drivers license or passport (depending on the use) and recorded along with time and date for reviewing at a later time.
FIG. 2 is a front view of the equipment shown in FIG. 1.
Figure 3:
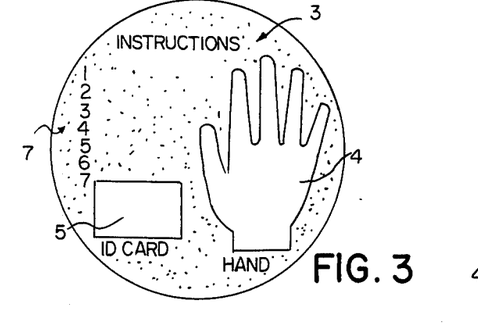
FIG. 3 is a top view of equipment of the system of FIGS. 1 and 2 for viewing the person's palm and ID card.

As shown in FIG. 1, the person 1 entering the system stands before a small platform 2 on which there are viewing areas. on the top surface 3. These viewing area on the top surface may be outlined and the surface is transparent at the viewing areas while the rest of the surface may be opaque. On the platform 3, there is a viewing area 4 for the hand and another viewing area 5 for the person's IC card or pass. These are clearly outlined and/or may be illuminated from below and preferably marked as shown in FIG. 3. The rest of the surface 3 is at least opaque and may carry simple instructions to the person as at 7.

In enclosure 8 below platform 2 beneath the surface 3 is an illuminating system 10 and the B video camera 11. These are contained within the enclosure that may be a secured cylinder 12, closed at the top by a ring 13 that carries the platform 3 and may threadably attach to the top of the cylinder. The bottom of the cylinder is closed by a bottom plate 14 and secured thereto by bolts 15 and has openings for video cables 16 and for an AC power line 17.

As shown in FIGS. 1 and 2, the platform 2 may be mounted to a wall 21 of a narrow package defined by wall 21 and wall 22. The person 1 enters that passage and stands in front of the platform at the designated place. At that position of the person, the A video camera 23 is located on the other side of wall 21 to view the person's face and a video monitor 24 may be located for easy observation by the person just above the platform 3. This monitor shows the person what is being recorded and enables him to cooperate in the recording. Camera 23 views the passengers face and, if desirable, part of his shoulders through a window 25 in wall 21. Clearly, the window may be a one-way viewing mirror and so appears as a mirror to the person. Another monitor 26 is provided for a guard or attendant and a video recorder such as a VCR 27 is operated by the guard or attendant.

A pressure sensitive pad 28 is provided on the floor in front of the platform 2 where the person stands to place his ID card on viewing area 5 and his hand on viewing area 4 of platform surface 3.

In operation, both of the cameras 11 and 23 are turned on at all times as also is the illuminating system 10 and whatever illumination (not shown) in the passage way is provided for illuminating the person's face. The monitors 24 and 26 are also turned on at all times. According to one method of operation, the VCR may also be turned on and run continuously. VCR's are available that can run for up to twenty hours on a single tape cassette. With this operation, the whole system is on all the time and so records continuously on the tape cassette one after another person that enter the passageway. A guard or attendant at monitor 26 may control a gate at the end of the passageway which he opens when each entering person has performed as instructed.

According to another method of operation, the VCR 27 may be turned on only when a person is standing at the platform and this can be detected by pressure mat 28 that operates a switch that turns on the VCR, via line 29, only when there is sufficient pressure on the pad. Or the attendant could turn the VCR on and off as desired to record each each person passing through the controlled gate.

For any of these operations, the video image from camera 11 of the person's palm and ID card and the video image from camera 23 of the person's face are produced at the same time. These video images are combined by a video splitter circuit that may be contained in one of the camera. For example, the video splitter circuit is contained in camera 11 and so the video output from camera 23, via cable 31, connects to a special input of camera 11 and the video output of camera 11 is the combined video image of the person's palm, face and ID card and is fed by cable 32 to both monitors 24 and 26 to VCR 27.

Figure 4:
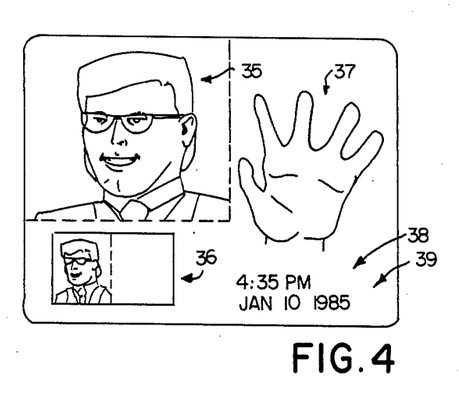
FIG. 4 shows the video monitor image that is produced on the monitor of the system if FIGS. 1 and 2.

In operation, when a person is standing before the platform 2 and follows the simple instructions, the combined video image that shows on both of the monitors is substantially as shown in FIG. 4. The combined video image shows the person's face at part 35 of the image, his ID card at 36 and the palm of his hand at 37. In addition the VCR may be set with the date and have a built-in clock from which are generated and added to the combined video image the time at 38 and the date at 39. This image, represented in FIG. 4, is recorded on the VCR and when it is recorded to the satisfaction of the guard or attendant, the person is allowed to pass on.

Figure 5:
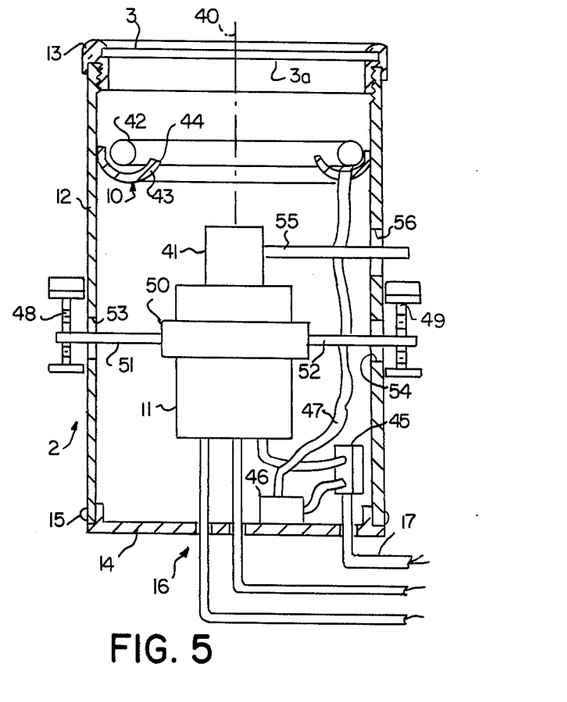
FIG. 5 is a side cross-section view of the container and the illumination and camera adjusting structures therein for the video camera that produces video images of the person's palm and ID card.

Container 12 for camera 11 and platform 3 provides an optical bench for the camera and platform and the platform is the object plane for that optical system. Between that object plane and the camera lens 41 is a lamp 42 that illuminates the object plane and may be a high intensity neon tube formed in a ring that fits coaxially within cylindrical container 12 as shown. Between lamp 42 and lens 41 is a reflector 43 that directs light from the lamp to the object plane and also forms an aperture at its inner edge 44 in the optical system that blocks any light from the lamp from entering directly into the lens 41. Also, the inside face 3b of the platform 3 may be slightly frosted so that it does not directly reflect an image of the lamp 42 into the lens 41.

As mentioned, the viewing surface 3 contains the hand and ID card windows 4 and 5 and the rest of that surface is opaque. It may be a disc of transparent glass or plastic that is coated on side 3a with a non-reflector non-transparent layer of black material, except for the area defined as the hand and the card windows 4 and 5 which are left essentially transparent. As mentioned, the side 3a of the plate at those windows may be frosted so that it does not directly reflect the lamp 42 into lens 41.

Electric power to camera 11 and lamp 42 comes from AC line power cable 17 that enters through a hole in plate 14 and connects to the input of junction box 45. From one terminal of box 45, AC line power is fed to camera 11 and from another output terminal the line power is fed to the lamp transformer 46. High voltage from the transformer is connected by cable 47 to lamp 42. Appropriate fuses may be provided in junction box 45 for the camera and lamp. This AC power system is enclosed within the container for safety.

Camera lens 41 and camera 11 are located axially on the optical axis 40 of this optical system. The axial position of the camera along axis 40 is adjustable from outside the container by turning screws 48 and 49 that position yoke 50 that carries the camera along axis 40. For this purpose, arms 51 and 52 from the yoke pass through openings slots 53 and 54 in the side of the container and are engaged by screws 48 and 49, respectively. Manual focus of the lens 41 can be done outside of the container by manipulating focusing arm 55 that extends through slot 56 in the side of the container to the outside. Slot 56 may be along an arc wide enough to turn the lens to focus on the object plane over the required range of focus. Clearly, the camera lens axial position along axis 40 and the manual forcus are coordinated adjustments to provide the desired image of the person's palm and ID card on the monitors. Similar adjustments can be made to camera 23 to perfect the image on the monitor of the person's face.

The system shown in FIGS. 1 and 5 can be used to identify customers entering a public bar to record each customers identification. Such customers must show that they are of drinking age which is usually done by showing their driver's license. This process is sometimes called "Carding".

With that use in mind, FIG. 1 shows a customer about to enter a club restricted to patrons who are of drinking age, standing at a designated place before platform 3 on which the following instructions are presented:

1. Stand against the front edge of this table;
2. Place your drivers license (or other ID showing your picture and birth date) face down on the ID Window;
3. Place your right hand palm down on the Hand Window; and
4. Look straight ahead into the mirror.

The platform top, shown in FIG. 3, provides Hand Window 4 for the customer's palm and ID Card Window 5 for the customer's drivers license, both clearly defined and the enclosure contains the B video camera 11 that has a field of view through its optical lens system that includes the customer'palm and IC Card through the windows and a lamp in the enclosure that illuminates the palm and ID Card, as already described.

Mirror 25 is a one way mirror that is reflective from the customer's side and transparent from the opposite side. On the opposite side is the A video camera 23 that has a field of view through its optical lens system that includes at least the customers face and preferably the customers head and shoulders. That field of view is preferably sufficient to include the face of the shortest and the tallest customer without tilting the camera and the lens system may include automatic focus control.

Immediately behind the customer is a barrier or wall 22 that prevents two customers, one behind the other, from standing at the edge of the table. This insures that the customer on camera A has his hand on the Hand Window and not another customer.

Here again, the system combines the simultaneous pictures from cameras A and b electronically providing a single video picture signal of which many frames are stored on a video tape in video cassette recorder 27 and video picture monitor 26 may be provided for an operator as well as monitor 24 for the customer.

The combined video picture stored on the tape cassette in VCR 27 is shown in FIG. 4 and includes time and date generated within the VCR as described. This combined image with time and date superimposed is recorded.

In operation, the customer stands against the front of the table as shown and performs according to the instructions. The cameras, illumination and monitors are on at all times. When the customer stands on mat 28, the VCR is turned on and the combined image with date and time, shown in FIG. 4 is recorded. Operated in which way it should take no more than a few seconds to process an experienced customer. It is also feasible to operate the VCR continuously, or the system can be operated by an operator who instructs the customer what to do and observes the monitor and when the combined picture shown in FIG. 4 is satisfactory, turns of the VCR and records it the combined video image.

Retail Customer—Recording Identification

Figure 6:
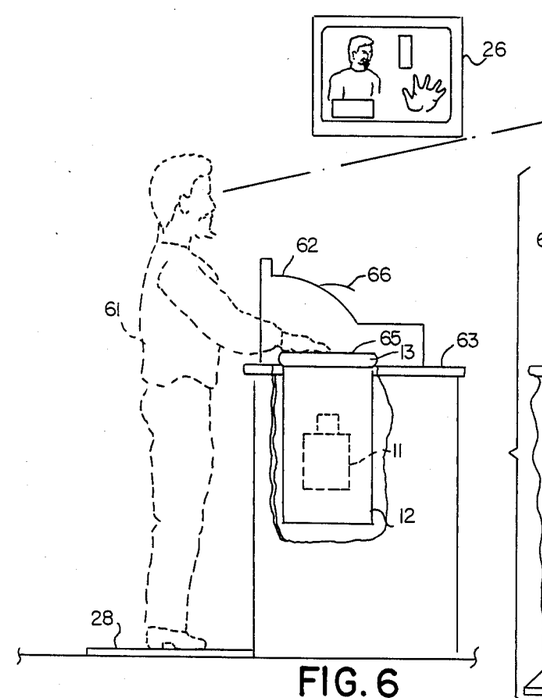
FIGS. 6 and 7 are partly pictorial diagrams of side and front views, respectively, showing the principal electrical video parts of an embodiment for monitoring and recording a customer about to purchase at a retail store, such as, for example an alcoholic beverage package store, standing at a designated place in front of the store case register, equipped to record images of the customer's palm and drivers license and in addition, to record an image of the store's sales receipt from the cash register.
Figure 7:
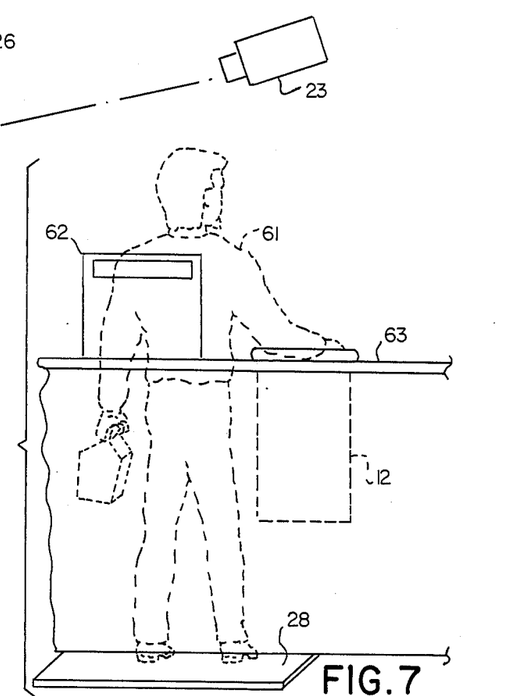
Figure 8:
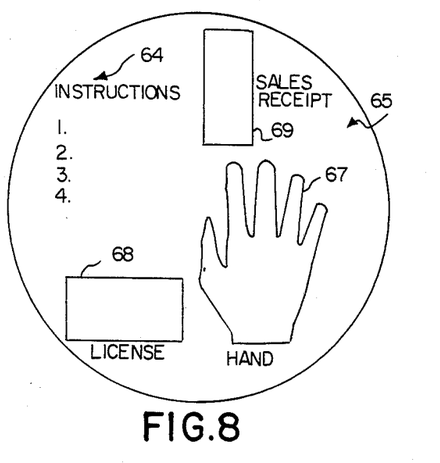
FIG. 8 shows the arrangement of viewing areas in the system of FIG. 6 for viewing the customer's, palm, drivers license and the sales receipt.

As mentioned above, the basic system shown in FIGS. 1 to 5 has use at the point of sale terminal or cash register of a retail store which the customer approaches to make payment and receive a receipt for a purchase. At that location and event, the sales clerk should make a record of the transaction as quickly and thoroughly as possible to provide the protections and records mentioned. This basic system adapted specifically for that purpose is shown by FIGS. 6 to 9. More particularly, FIGS. 6 to 8 show an embodiment of the system of the present invention particularly adapted for recording the customer's palm, face, drivers license and a record of the sale.

As shown in FIGS. 6 and 7, a customer 61 about to purchase standing at cash register 62 which is on counter 63, first pays for the goods and is instructed at 64 on viewing platform 65:

1. Place your drivers license face down on the ID Window; and
2. Place your right hand palm down on the Hand Window.

The clerk then rings up the sale on the case register, takes the printed receipt 64 from the case register and places it face down on the viewing platform 65 where the platform is marked "Sales Receipt" and while all this is happening, the customer is standing on pressure mat 28 that actuates a switch that turns the VCR on.

The top of viewing platform 65 is shown in FIG. 8. Most of it is opaque and it provides viewing windows 67, 68 and 69 for the customer's palm, license and sales receipt, respectively. All of these windows are in glass or plastic plate 3 mounted to the top of container 12 (shown in FIG. 5) that is mounted in counter 63 next to cash register 62.

Here, video camera 23 has a field of view through its optical lens system that includes at least the customer's face and preferably the customer's shoulders and may also include the cash register and the counter. The system combines the simultaneous pictures from cameras 23 and 11 electronically providing a single video picture signal of which may frames are stored on VCR 27 that may be located under the counter. A video picture monitor 26 is provided for both the customer and the clerk to observe and that monitor, both cameras and the illumination for both cameras are turned on all of the time.

Figure 9:
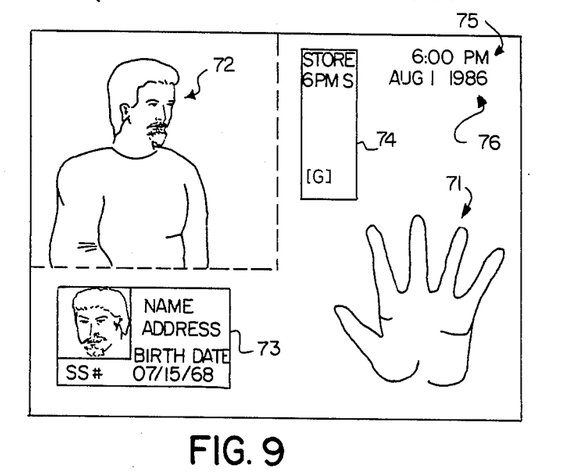
FIG. 9 shows the video monitor image that is produced by the system of FIGS. 6 to 8.

The combined video pictures stored in the VCR is represented in FIG. 9 as a composite picture that includes the customer's palm at 71, face and shoulders at 72, drivers license at 73 which may have a picture of the licensee on it, the sales receipt at 74, the time at 75 and the date at 76.

In operation, the customer stands at the counter in front of the cash register and pays for the purchase. The clerk enters the payment in the case register which produces the receipt. Meanwhile, the customer performs according to the instructions and places his drivers license face down on window 68 and his hand palm down on window 67. The clerk then places the receipt on window 69 and as long as the customer stands on mat 28, the combined video picture such as represented in FIG. 9 is recorded. Operation may also be entriely under the clerk's control and for that purpose an operate switch may be provided for the clerk to begin and end recording.

The field of view of camera 11 (the windows 67, 68 and 69) is illuminated by light in enclosure 12 and the field of view of camera 23 is lighted by the normal light in the store. As mentioned, the cameras and monitor and lights are on continuously. Operated in this way, it should take no more time to process an experienced customer that it normally a clerk to make the sale.

Airline Passenger Monitoring and Recording

Figures 10, 11, 12:
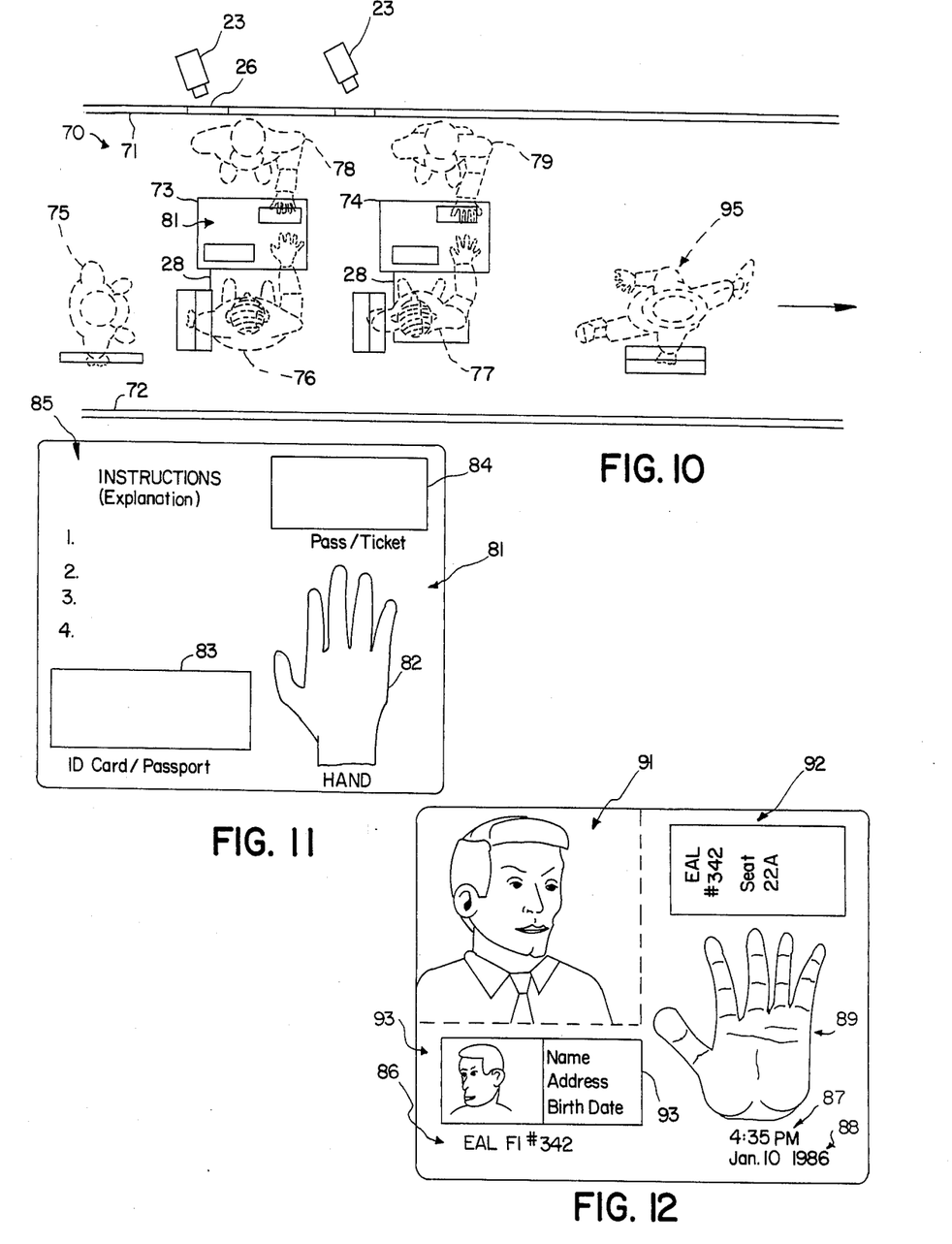
FIG. 10 is a top plan view of the entrance area to the narrow passageway from the gate of an airline terminal to an airplane where it is usual for passengers about to go on board to enter and show their boarding pass and/or ticket, equipped to record video images of each passenger's palm, face, boarding pass or ticket and ID card or passport.
FIG. 11 shows the arrangement of viewing areas in the system of FIG. 10 for viewing the passenger's palm, boarding pass and ticket or pasport.
FIG. 12 shows the video monitor image that is produces by the system of FIGS. 10 and 11.

FIG. 10 to 12 illustrate an embodiment of the invention for monitoring and recording personal information about passengers entering and boarding air airplane. FIG. 10 is a top plan view showing the entrance to the narrow passageway 70 between walls 71 and 72. Usually, passengers enter such a passageway like 70, single file and one after another and show their boarding passes to an attendant. A system and method are provided according to the present invention and illustrated in FIGS. 10 and 12 for monitoring and recording each entering passenger's hand palm, face, ID card or passport and boarding pass or ticket in just about the same time it takes for an attendant to inspect each passenger's boarding pass and ticket in the conventional way.

Passengers entering, like passenger 75, step up to one of the two platforms 73 or 74 and so stand on the mat 28 in front of the platform. Passengers 76 and 77 are shown standing in this way before platforms 73 and 74. attendants 78 and 79 at these platforms instruct the passenger and check that he places his ID card or passport face down on the appropriate viewing area on the top surface 81 of the platform. The top surface 81 is shown in FIG. 11 as it appears to the passenger. It includes a window 82 for the passenger's hand placed palm down thereon, window 83 for the passenger's ID card or passport, window 84 for the passenger's boarding pass or ticket and may include instructions 85 and/or explanations to the passenger of what this monitoring and recording is all about. Other than the windows, the top 81 is opaque.

Within each of the platforms is a container like 12 (shown in FIG. 5) containing camera 11, illuminating light 12 and all other parts shown therein. A second camera 23 for each system may be mounted above the attendant so that its field of view is at the head and shoulder level of the passenger standing on mat 28 and camera 23 takes in that view through a window 26 in the wall 71. That window may be a one-way window and so appear as a mirror to the passenger. A monitor like monitor 26 in the previous embodiments may be provided for the attendants and located in the platform 73 so that the attendant can see it although the passenger may not be able to see it, or a monitor for the aattendant may be located in the opposite wall 72 of the passageway. In additionm other monitors may be located at a remote location and viewed by police or other authorities who are trained or may have special knowledge from which to identify possible wrongdoers, known criminals, etc.

In operation, a passenger stands on the mat 28 in front of the stand 81 and hands his boarding pass or ticket to the attendant who places it face down on window 84 and instructs the passenger to place his ID card or passport face down on window 83 and place his right hand on window 82. At that point, the attendants monitor shows the combined images as represented in FIG. 12 which may or may not also include the airline and flight designation at 86, the time at 87 and the date at 88. The combined picture shows the passenger's palm at 89, face and the shoulders from camera 23 at 91, boarding pass or ticket at 92 and ID card or passport at 93.

The airline identification, flight number, time and date can be superimposed on the image on the attendant's monitor and on the remote monitor as well as on the recorded image. Of this information, the airline designation and flight number may be keyed in by the attendant and the time and date may be provided automatically by calendar and clock circuits in the system that generate the video images for those indications. At the remote location, a VCR like VCR 27 records all of this information about each passenger who enters. When a passenger has completed this simple procedure, which should not take more than a few seconds, he proceeds on like passenger 95 to the airplane.

Video System

Figure 13:
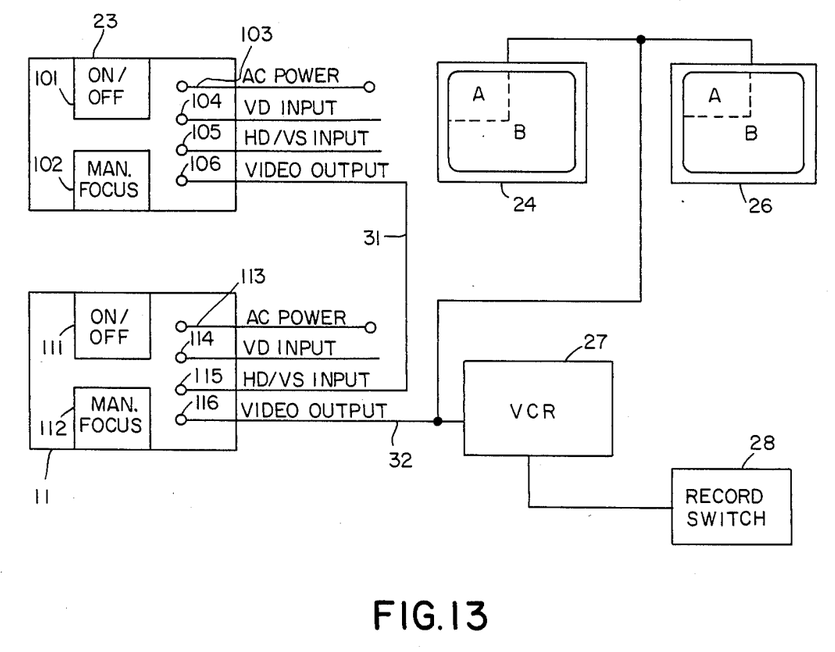
FIG. 13 is a diagram showing the vido connections between video camers, VCR and video monitors such as are present commercially available from major suppliers.

FIG. 13 is a diagram showing a suitable video system for practice of the present invention including commercially available video cameras, VCR, and monitors. The reference numbers on these items are the same as the equivalent parts shown in the figures of the embodiments. The cameras 11 and 23 may both be obtained from Panasonic Industrial Company (a Division of Matsushita Electric Corporation of American) designated WV-1500/1550. The cable connectors, power line, on/off switch and manual focus button for these cameras are all at the back of the camera and depicted as such in FIG. 13. For example, camera 23 includes on/off switch 101, manual focus control 102, AC power cord 103 and coaxial connector terminals 104, 105, and 106 for connections denoted VD input, HD/VS input and video output, respectively.

The VD input is for external sync and need not be used in the embodiments herein as the camera is also capable of internal 2:1 EIA RS170 sync. The VD input connector is not used in camera 23, only the video output connector from camera 23 is fed by coaxial line 31 to camera 11. Camera 11 is specially equipped with a Pansonic video splitter circuit designated WV-291 that is adjusted to split the video image into parts A and B as represented in FIG. 4. This split places the video image from the A camera 23 at the position A on the monitor and the video images from the B camera 11 at the position B on the monitor.

FIG. 13 shows also the back of camera 11 which has an on/off switch control 11, manual focus 112, ac power line connection 113 and coaxial connectors identified as VD input HD/VS input and video input denoted 114, 115, and 116, respectively. Coaxial cable 31 connects terminal 106 and 23 to terminal 114 of 11 and coaxial cable 32 from terminal from 116 carries the combined video image from both cameras to the monitors 24 and 26 and to VCR 27. VCR 27 may be a Panasonic Time-Lapse Recorder designated AG-6010. The date can be set on the control panel of this recorder and the recorder has an internal clock that generates time and both the time and date can be imposed on video images that are recorded.

VCR 27 is turned on and off by a record switch in mat 28. Monitors 24 and 26 may be the same, they may be high resolution, black and white, twelve to twenty inch, desk-top monitors, such as Panasonic monitors designated WV-5410. These have a horizontal resolution of 850 lines at the center.

Security Monitoring with Access to Personal Records

Figure 14:
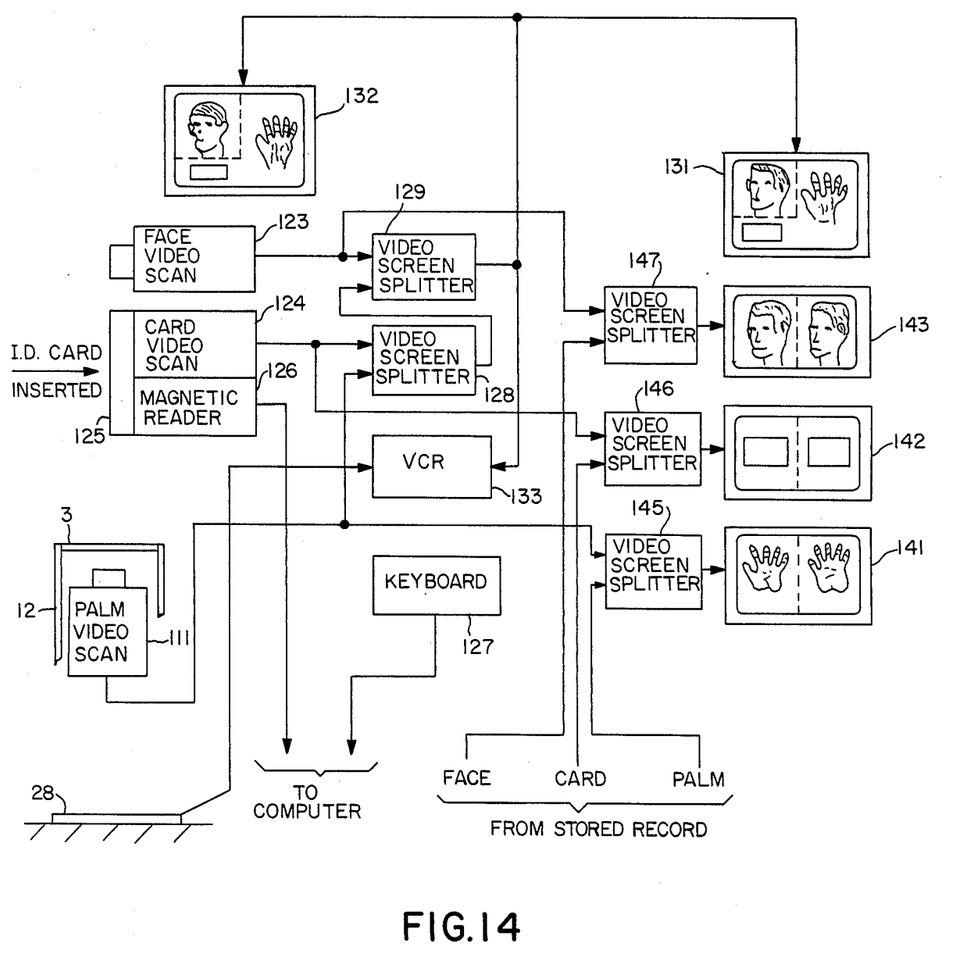
FIG. 14 is a block diagram of an embodiment of the system for use by a guard to monitor entrance to a secured area by qualified personnel for whom the guard has access to personal records including palm print and/or picture of the face and/or ID card details that the guard can call up for comparison to the corresponding video pictures generated at the time of the person seeking entrance.

FIG. 14 shows in block diagram form a video system including several video cameras and a video scanneer, a VCR and monitors that is operated by a guard or security personnel to produce images on a subject's palm and face dand ID card as the other embodiments already described. In addition, this system reads information recorded on the ID card that may be recorded, for example, magnetically and that information is fed to a counter along with other information that may be fed to the computer by the operator from a key board.

The computer (not shown) responds by looking up stored records of the individual to whom the ID card was properly issued and presents that information for comparison with the palm and face of the person presenting the ID card. This system is intended not only to record, but also to present information from stored files as an aid to the guard to determine quickly whether the individual who presents the ID card is in fact the one to whom the card was issued and/or if the card has been tampered with or is a forgery.

As shown in FIG. 14, a video camera 111 is provided for producing an image of the person's palm and may be located in a container as shown in FIG. 5 inclluding all other equipments shown therein for illuminating the individual's palm. Another camera 123 produces a video image of the individual's face. At the same time, a video image of the individual's ID card is obtained from a video scanner 124 that may be part of apparatus 125 into which the person inserts his ID card and in which the face of the card having the person's picture and/or other information on it that can be optically scanned is scanned by the scanner 124 and in which a magnetic reader 126 reads any magnetic information encoded on the card and immediately feeds that information to the computer along with other information from keyboard 127 operated by the guard.

The video images from camera 11 and scanner 124 are fed to video screen splitter circuit 128 and the output of 128 is fed along with the video image from video camera 123 to another video screen splitter 129. The output of 129 is the combined video image of the person's palm, face, and ID card and is fed to monitors 131 and 132 and also to VCR 133. VCR 133 is turned on and off by a switch operated by pressure on mat 28 on which the person stands when placing his palm for scanning 111 and his face is within the view of camera 123.

Monitors 141, 142 and 143 are provided for presenting the guard or attendant any information from stored records about the individual to whom the ID card was originally issued. That information may be text or pictorial. For immediate screening and decision about the person presented the ID card, retrieval from storage must be done within seconds or the processing of the individual may be slowed down excessively. Clearly, text and pictorial information in the form of diagram can be stored in state-of-the-art equipment and can be retrieved from that equipment in seconds. Photographic information can also be stored, however, with state-of-the-art equipment cannot be retrieved in seconds and takes a good deal longer. Clearly, using the system in FIG. 4 to process individuals in a few seconds time requires retrieval of such information within seconds.

Retrieval in a few seconds is not a problem with video text and so the text that should appear on on the ID card can be retrieved and presented easily within a fraction of a second. Pictorial information can also be retrieved within a fraction of a second and so a pictorial representation of the individual's palm can be retrieved from storage fast enough to serve the system and a pictorial representation of the individual's face could also be retrived fast enough to serve the system. Of these two pictorial representations, clearly the palm can be compared by an operator with the palm presented by the individual and scanned by camera 111 more quickly and with more assurance than the individual's face.

In this embodiment, three monitors 141, 142 and 143 for the person's palm, face and ID card are shown although it is discretionary with the application whether all of these would be used; that depends upon what information is available from storage. At any rate, the video image of the person's palm from camera 111 along with pictorial video image from stored records are fed to video screen splitter 145 that may split these images equally on the screen of monitor 141 so that they can be compared side by side as represented in the Figure.

Similarly, the video image of the person's ID card from scanner 124 along with video text image from the stored record are fed to video screen splitter 146 and those images are presented side by side on the screen of monitor 142. Clearly, if the text on the ID card and the text from storage are arranged in the same way as presented on monitor 142, and guard can make the comparisons most quickly and accurately. The purpose here is to merely check that the information on the ID card is the same as the information from storage.

Also, in a similar way pictorial information from a storage along with the video image from camera 123 are fed to video screen splitter 147 and presented side by side on the screen of monitor 143 for inspection by the guard. This pictorial information of the proper owner of the ID card in pictorial form from storage may be from the same photograph that shows on the face of the card and so may not look any more like the individual presenting the card than the picture of the face on the card even though it is the proper individual, because faces change and look different in different lighting, with or without eye glasses, with or without mustache, beard, etc. and such a review by the guard to be accurate and thorough just simply takes time. The quicker more accurate and more reliable review is the comparison of palms.

Clearly, a palm can not be forged, it is unique to each individual and it is most difficult for an impostor to disguise his palm to look like the palm of the person from whom the ID card may be stolen, because it is most unlikely that the impostor would know what that person's palm looks like. However, the impostor may know what that person's face looks like and may be able to disguise himself to look like the face on the stolen ID card.

Conclusion

Rapid recording of images of an individual's palm and face along with ID items presented by the individual like a badge, card, drivers license, passport, etc., for immediate inspection by a guard, store clerk or attendant, etc. that can be reviewed later, is accomplished by all embodiments of the present invention. The embodiments describe particular uses of the basic system with additions and modifications thereto. These embodiments are shown and described as they are the preferred embodiments of the invention and it will be apprent to those skilled in the art that changes may be made in any of these without departing from the spirit and scope of the invention as set forth in the claims.

What is claimed is:

1. In a system for identifying a person who enters a designated place and presents an identification (ID) card containing information about himself, the imporvement comprising in combination,
   (a) a plam viewing window of transparent material having an outside surface and an inside surface oriented so that said person at said designated place can easily place the palm of his hand against said palm window outside surface,
   (b) an ID card viewing window (ID card window) of transparent material having an outside surface and an inside surface oriented so that said person at said designated place can easily place his ID card against said ID card window outside surface,
   (c) a video camera on said inside surface side of both said palm window and said ID card window,
   (d) a source of illumination on said inside surface side of both said palm window and said ID card window,
   (e) said palm window, said ID card window, said source of illumination and said video camera forming an optical system of which said palm against said palm window outside surface and said ID card against said ID card window outside surface is the object (palm and ID card object), said source of illumination illuminates said palm and ID card object and said camera intercepts the image of said palm and ID card object and produces a palm video image of said palm and ID card optical image and
   (d) a video recorder for recording said palm and ID card video image.

2. A system as in claim 1 wherein,
   (a) said palm and ID card windows are coplanar.

3. A system as in claim 2 wherein,
   (a) said palm and ID card windows are parts of a common platform.

4. A system as in claim 3 wherein,
   (a) said common platform is at one end of an elongated enclosure that has a longitudinal axis and
   (b) the plane of said platform is perpendicular to said longitudinal axis.

5. A system as in claim 4 wherein,
   (a) said camera has a lens system in optical alignment therewith and said lens system optical axis is along said enclosure longitudinal axis.

6. A system as in claim 5 wherein,
   (a) said source of illumination is inside said elongated enclosure positioned between said video camera lens system and said common platform.

7. A system as in claim 6 including,
   (a) an illumination reflector inside said elongated enclosure positioned between said source of illumination and said video camera lens system.

8. A system as in claim 7 wherein,
   (a) said common platform closes one end of said enclosure and
   (b) a cover is provided for the other end of said enclosure
   (c) whereby said enclosure, platform and cover completely enclose and contain said camera and lens system, said source of illumination and said reflector.

9. A system as in claim 8 wherein,
   (a) openings are provided through said cover for a video signal cable from said camera to said video recorder and for an electric power cable to said camera and said source of illumination.

10. A video image system for identification of a person at a designated place comprising in combination,
    (a) a palm viewing window so positioned at said designated place that said person can easily place the palm of his hand against said palm window,
    (b) an ID card viewing window so positioned at said designated place that said person can easily place his ID card against said ID card window,
    (c) video camera means directed optically at said windows for producing video images of said person's palm and ID card,
    (d) other video camera means directed optically at said person's face for producing a video image of said face,
    (e) means for combining said video images producing a combined video image and
    (f) means for storing said combined video image,
    (g) whereby said combined video image can be retrieved from said storage means and reviewed.

11. A video image system as in claim 10 wherein,
    (a) means are provided for displaying said combined video image as it is produced.

12. A video image system as in claim 10 wherein,
    (a) means are provided including timing means and means responsive thereto for producing a video image of time and for combining said video image of time as part of said combined video image.

13. A video image system as in claim 10 including,
    (a) an optical system for optically combining optically combining optical images of said person's palm and ID card through said windows, producing a combined palm and ID card optical image and
    (b) said video camera means converts said combined palm and ID optical image to a video image of the same.

14. A video system as in claim 10 including,
    (a) said palm viewing window (palm window) is transparent material having an outside surface and an inside surface oriented so that said person can easily place the palm of his hand against said palm window outside surface,
    (b) said video camera means includes a first video camera on said inside surface side of said palm window,
    (c) a source of illumination on said inside surface side of said palm window,
    (c) said palm window, source of illumination and first video camera forming an optical system of which said palm against said palm window outside surface is the object (palm object), said source of illumination illuminates said palm object and said first camera intercepts the image of said palm object and produces a palm video image of said palm optical image and
    (d) said means for recording includes a video cassette recorder (VCR) for recording said palm video image.

15. A video image system as in claim 14 including,
    (a) said ID card viewing window (ID card window) is transparent material having an outside surface and an inside surface oriented so that said person can easily place his ID card against said ID card window outside surface, (b) said video camera means and said source of illumination being on said inside surface side of said ID card window,
(c) said ID card against said ID card window outside surface is another object (ID card object) of said optical system and said first camera intercepts the image of said ID card object and produces an ID card video image of said ID card optical image and
(d) said VCR records said ID card video image.

16. A video image system as in claim 15 wherein,
(a) said palm and ID card windows are coplanar.

17. A video image system as in claim 16 wherein,
(a) a common platform is provided for said palm and ID card windows.

18. A video image system as in claim 17 wherein,
(a) an elongated enclosure that has a longitudinal axis is provided and said common platform is at one thereof and
(b) the plane of said common platform is perpendicular to said enclosure longitudinal axis.

19. A video image system as in claim 18 wherein,
(a) said first camera has a lens system in optical alignment therewith and said first camera lens system optical axis is along said enclosure longitudinal axis.

20. A video image system as in claim 19 wherein,
(a) said source of illumination is inside said elongated enclosure positioned between said first video camera lens system and said common platform.

21. A system as in claim 20 including,
(a) an illumination reflector inside said elongated enclosure positioned between said source of illumination and said first video lens system.

22. A video image system as in claim 21 wherein,
(a) said common platform closes one end of said enclosure and
(b) a cover is provided for the other end of said enclosure
(c) whereby said enclosure, platform and cover completely enclose and contain said first video camera and lens system, said source of illumination and said reflector.

23. A video image system as in claim 22 wherein,
(a) openings are provided through said cover for a video signal cable from said first video camera to said video recorder and for an electric power cable to said first video camera and said source of illumination.

24. A video image system as in claim 17 wherein,
(a) said common platform closes one end of said enclosure and
(b) a cover is provided for the other end of said enclosure
(c) whereby said enclosure, platform and cover completely enclose and contain said first video camera and lens system and said source of illumination.

25. A video image system as in claim 24 wherein,
(a) openings are provided through said cover for a video signal cable from said first video camera to said video recorder and for an electric power cable to said first video camera and said source of illumination.

26. A system for identifying a customer of a retail store where the customer presents a drivers license and for recording a sale made to the customer while said customer is at said store point of sale terminal (cash register) comprising in combination,
(a) a palm viewing window so positioned near said cash register that said customer can easily place the palm of his hand against said palm viewing window,
(b) a drivers license viewing window so positioned near said cash register that said customer can easily place his drivers license against said drivers license viewing window,
(c) video camera means directed optically at said windows for producing video images of said customer's palm and drivers license,
(d) other video camera means directed optically at said customer's face for producing a video image of said face,
(e) means for combining said video images producing a combined video image and
(f) means for storing said combined video image,
(g) whereby said combined video image can be retrieved from said storage means and reviewed.

27. A video image system for identifying a passenger of an airplane who presents a boarding pass or ticket (pass/ticket) at the entrance to said airplane comprising in combination,
(a) a palm viewing window so positioned near said entrance that said passenger can easily place the palm of his hand against said palm window,
(b) a pass/ticket viewing window so positioned near said entrance that said passenger can easily place his pass/ticket against said pass/ticket window,
(c) video camera means directed optically at said windows for producing video images of said passenger's palm and pass/ticket,
(d) other video camera means directed optically at said passenger's face for producing a video image of said face,
(e) means for combining said video images producing a combined video image and
(f) means for storing said combined video image,
(g) whereby said combined video image can be retrieved from said storage means and reviewed.

* * * * *